United States Patent
Smith et al.

(10) Patent No.: US 10,664,858 B2
(45) Date of Patent: May 26, 2020

(54) SYSTEMS AND METHODS FOR DETERMINING DISCOUNTED PRICES FOR ONLINE ORDERS

(71) Applicant: WAL-MART STORES, INC., Bentonville, AR (US)

(72) Inventors: Austin Lee Smith, Burlingame, CA (US); Vidyanand Krishnan, Sunnyvale, CA (US); Michael Gilbert Ebener, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 347 days.

(21) Appl. No.: 15/628,407

(22) Filed: Jun. 20, 2017

(65) Prior Publication Data
US 2018/0365725 A1 Dec. 20, 2018

(51) Int. Cl.
*G06Q 30/02* (2012.01)
*G06Q 30/06* (2012.01)
*G06Q 10/08* (2012.01)

(52) U.S. Cl.
CPC ... *G06Q 30/0222* (2013.01); *G06Q 10/08355* (2013.01); *G06Q 30/0639* (2013.01)

(58) Field of Classification Search
CPC combination set(s) only.
See application file for complete search history.

(56) References Cited

U.S. PATENT DOCUMENTS

| | | | |
|---|---|---|---|
| 2006/0206395 A1* | 9/2006 | Vallabh | G06Q 10/08 705/26.1 |
| 2006/0230144 A1* | 10/2006 | Shah | H04L 43/16 709/225 |
| 2011/0125566 A1* | 5/2011 | McLaughlin | G06Q 20/20 705/14.23 |
| 2011/0161203 A1* | 6/2011 | Florence | G06Q 10/063 705/27.1 |
| 2011/0173041 A1* | 7/2011 | Breitenbach | G06Q 10/06311 705/7.13 |
| 2013/0006739 A1 | 1/2013 | Horvitz et al. | |

(Continued)

FOREIGN PATENT DOCUMENTS

| | | | | |
|---|---|---|---|---|
| JP | 2006072447 A | * | 3/2006 | |
| WO | WO-0068856 | * | 11/2000 | G06Q 30/06 |
| WO | WO-0111523 A1 | * | 2/2001 | G06Q 30/06 |

*Primary Examiner* — Marie P Brady
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of receiving an order from an electronic device of a customer, the order comprising one or more items, determining at least one of a store employee or a delivery driver is available to fulfill the order during a first window of time of a plurality of windows of time, coordinating displaying the plurality of windows of time on the device of the customer with a discounted price for the order proximate the first window of time, and, if the one or more non-transitory storage modules receive a selection of the first window of time from the electronic device of the customer, coordinating displaying an order completion page with the discounted price for the order.

20 Claims, 5 Drawing Sheets

(56) References Cited

U.S. PATENT DOCUMENTS

| | | | |
|---|---|---|---|
| 2014/0164126 A1 | 6/2014 | Nicholas et al. | |
| 2015/0161667 A1* | 6/2015 | Stevens | G06Q 30/0264 |
| | | | 705/14.23 |
| 2015/0220958 A1* | 8/2015 | Tietzen | G06Q 30/0226 |
| | | | 705/14.15 |

* cited by examiner

400

405 – Receiving a prior order from an electronic device of a prior customer for a delivery of one or more items of the prior order at a second address.

410 – Coordinating displaying a plurality of windows of time on the second electronic device of the prior customer.

415 – Receiving a prior selection of a first window of time from the electronic device of the prior customer.

420 – Receiving a first order from an electronic device of a first customer, the first order comprising one or more items.

425 – Determining at least one of a store employee or a delivery driver is available to fulfill the first order during the first window of time of the plurality of windows of time.

430 – Coordinating displaying the plurality of windows of time on the electronic device of the first customer with a first discounted price for the first order proximate the first window of time.

435 – Coordinating displaying a first order completion page with the first discounted price for the first order.

440 – Coordinating displaying a map webpage on the electronic device of the first customer.

FIG. 4

SYSTEMS AND METHODS FOR DETERMINING DISCOUNTED PRICES FOR ONLINE ORDERS

TECHNICAL FIELD

This disclosure relates generally to determining discounted prices for online delivery and online pickup orders.

BACKGROUND

Many customers of retail or grocery stores now desire the convenience of having their orders delivered to their homes and/or picking up their already-collected orders at a designated area of the store. These orders are often made online by the customers using a website or mobile application for the store. A common problem faced by stores, however, is coordinating efficient collection and/or delivery of these orders.

BRIEF DESCRIPTION OF THE DRAWINGS

To facilitate further description of the embodiments, the following drawings are provided in which:

FIG. 4 is a flowchart for a method, according to certain embodiments; and

Figure 1:
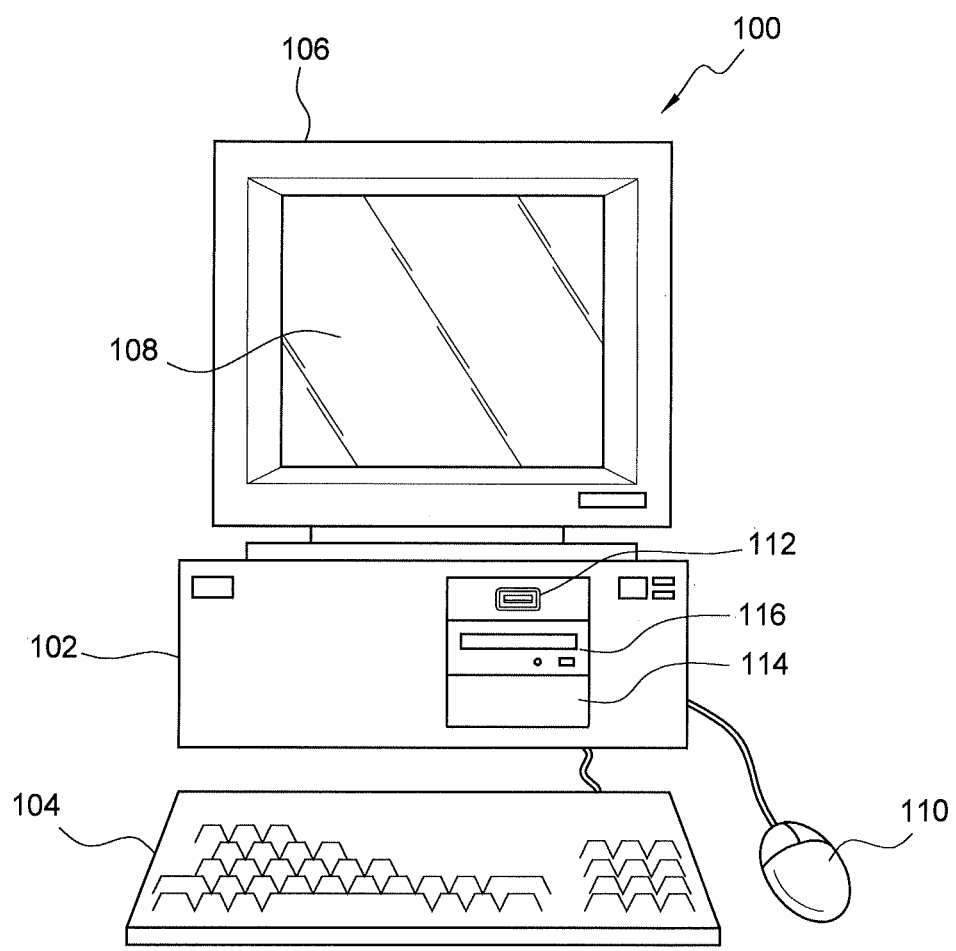
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of receiving a first order from a first electronic device of a first customer, the first order comprising one or more first items. The one or more storage modules can be further configured to run on the one or more processing modules and perform an act of determining at least one of a store employee or a delivery driver is available to fulfill the first order during a first window of time of a plurality of windows of time. The one or more storage modules can be further configured to run on the one or more processing modules and perform an act of coordinating displaying the plurality of windows of time on the first electronic device of the first customer with a first discounted price for the first order proximate the first window of time. The one or more storage modules can be further configured to run on the one or more processing modules and perform an act of, if the one or more non-transitory storage modules receive a first selection of the first window of time from the first electronic device of the first customer, coordinating displaying a first order completion page with the first discounted price for the first order.

Various embodiments include a method. The method can include receiving a first order from a first electronic device of a first customer, the first order comprising one or more first items. The method also can include determining at least one of a store employee or a delivery driver is available to fulfill the first order during a first window of time of a plurality of windows of time. The method also can include coordinating displaying the plurality of windows of time on the first electronic device of the first customer with a first discounted price for the first order proximate the first window of time. The method also can include, if a first selection of the first window of time from the first electronic device of the first customer is received, coordinating displaying a first order completion page with the first discounted price for the first order.

Figure 2:
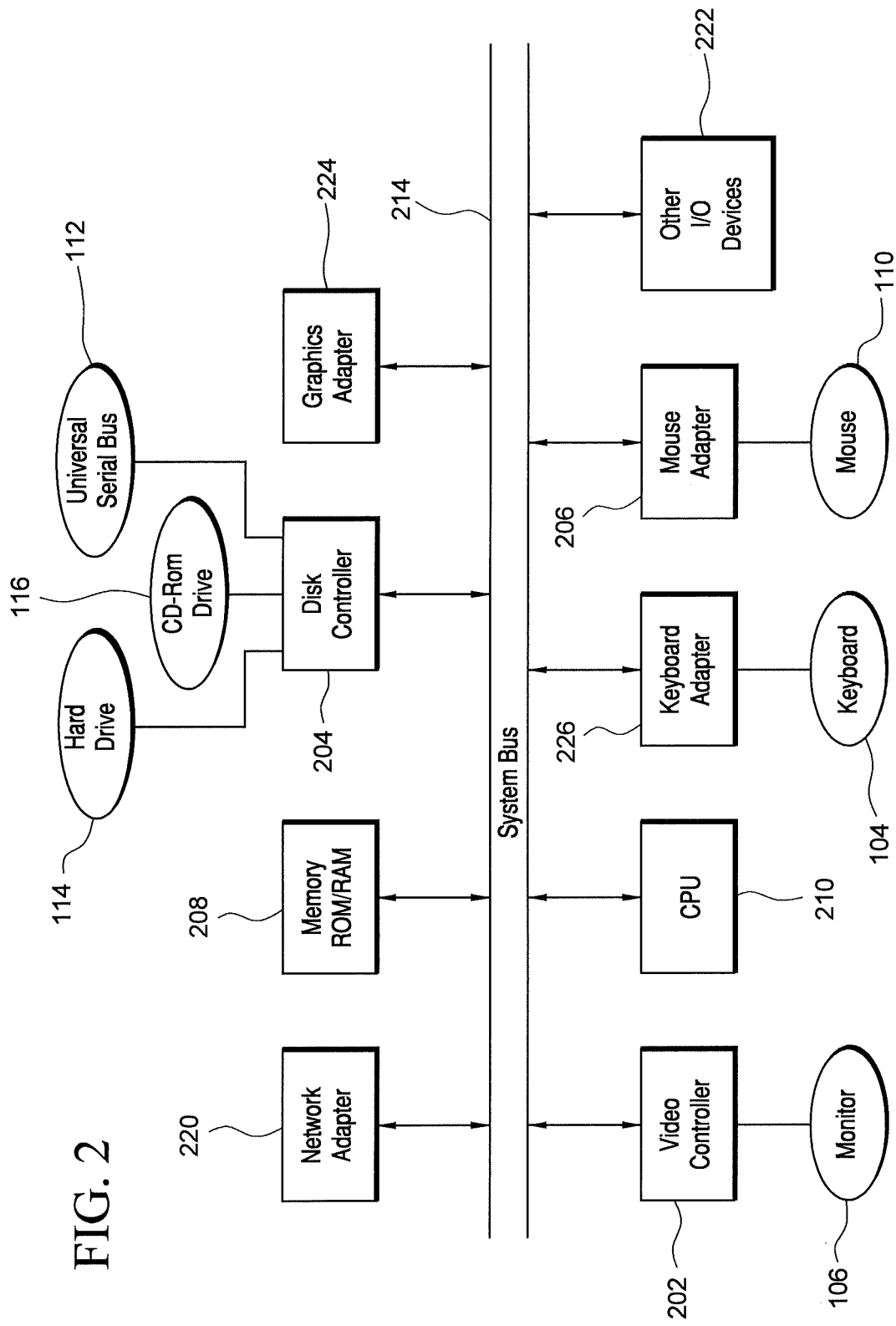
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc.

In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
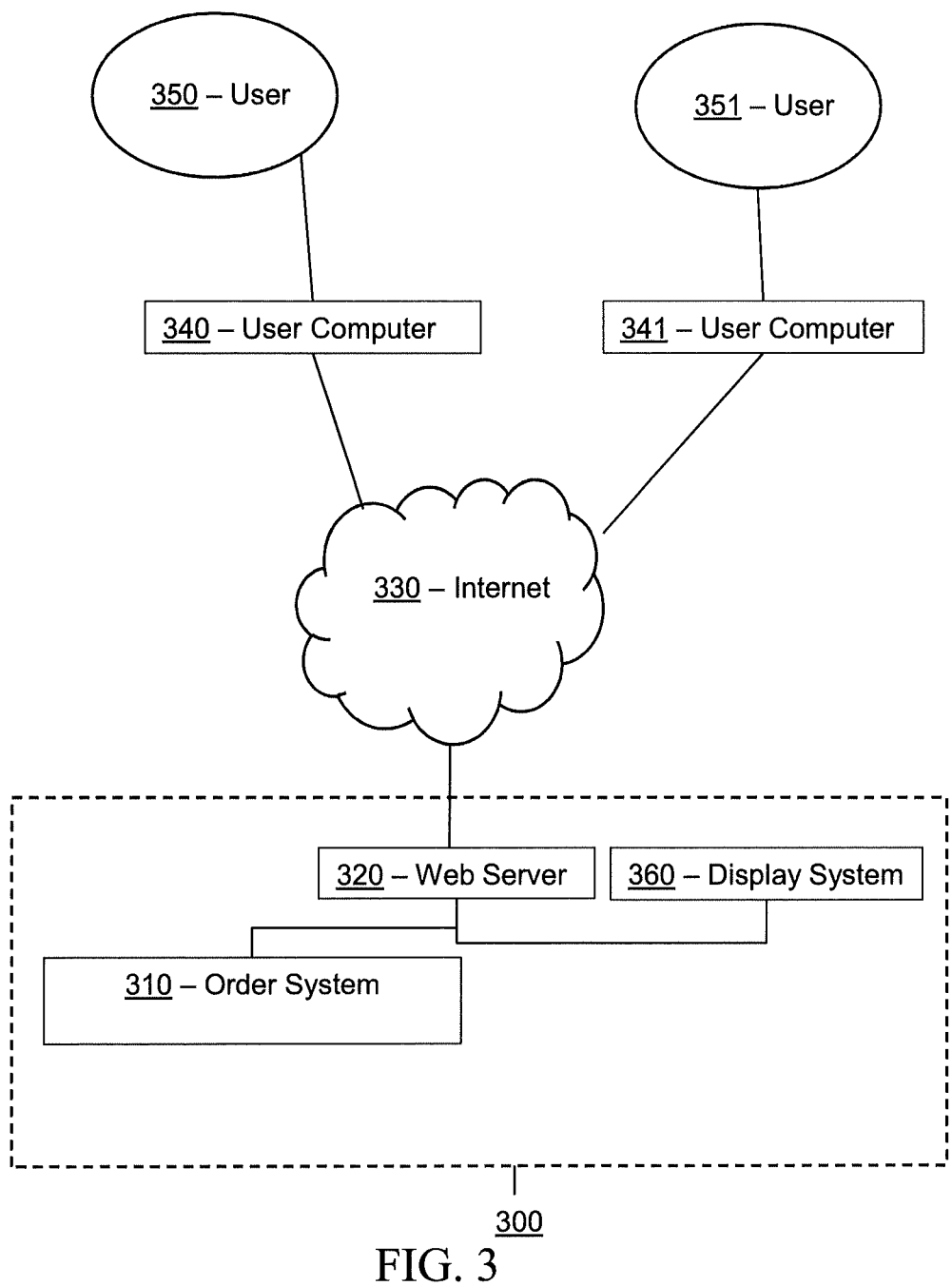
FIG. 3 illustrates a representative block diagram of a system, according to an embodiment.

Turning ahead in the drawings, FIG. 3 illustrates a block diagram of a system 300 that can be employed for determining discounted prices for online orders, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an order system 310, a web server 320, and/or a display system 360. Order system 310, web server 320, and display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of order system 310, web server 320, and/or display system 360. Additional details regarding order system 310, web server 320, and display system 360 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, and/or to purchase products, in addition to other suitable activities.

In many embodiments, order system 310, web server 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) order system 310, web server 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of order system 310, web server 320, and/or display system 360. In a similar manner, the processing module(s) and the memory storage module(s) can be local and/or remote to each other.

In many embodiments, order system 310, web server 320, and/or display system 360 can be configured to communicate with one or more user computers 340 and 341. In some embodiments, user computers 340 and 341 also can be referred to as customer computers. In some embodiments, order system 310, web server 320, and/or display system 360 can communicate or interface (e.g., interact) with one or more customer computers (such as user computers 340 and 341) through a network or internet 330. Internet 330 can be an intranet that is not open to the public. Accordingly, in many embodiments, order system 310, web server 320, and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, order system 310, web server 320, and/or display system 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between order system 310, web server 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
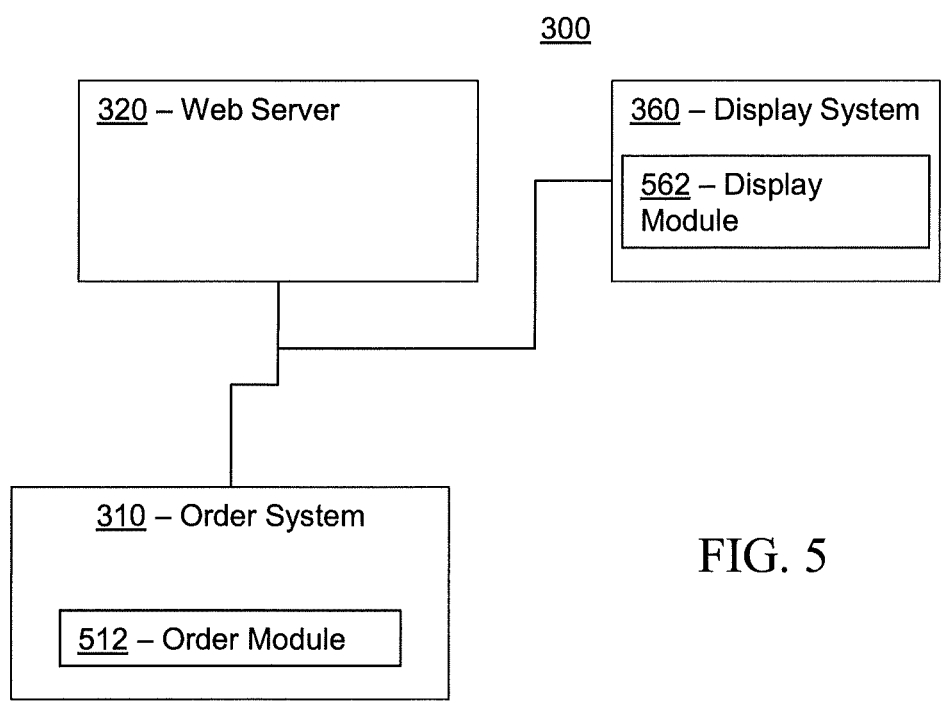
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512 and/or 562 (FIG. 5). Such non-transitory memory storage modules can be part of a computer system such as order system 310, web server 320, and/or display system 360 (FIGS. 3 & 5). The processing module(s) can be similar or identical to the processing module(s) described above with respect to computer system 100 (FIG. 1).

In many embodiments, method 400 can be utilized when customers are placing orders on a website of a retailer. The orders can be placed by the customers using electronic devices, such as but not limited to mobile electronic devices like watches or phones, tablet computer electronic devices, desktop computer electronic devices, and the like. The orders placed by customers can be for one or more items sold by the retailer, including but not limited to groceries, electronics, clothing, media, equipment, and so on.

In some embodiments, the website of the retailer can be associated with one or more brick and mortar retail stores, one or more fulfillment centers, one or more distribution centers, and the like within a predetermined proximity to the customer placing the order. As shall be described in greater detail below, the orders placed by customers on the website of the retailer can be orders for (1) pickup at a brick and mortar retail store by the customer after a store employee has collected the order at the store, or (2) delivery to the customer at an address associated with or otherwise selected by the customer placing the order. Delivery drivers used to deliver the orders can comprise store employees and/or third-party delivery drivers. For example, in some embodiments, the delivery driver can comprise a delivery driver from a crowd-sourced delivery service. Moreover, various different embodiments of method 400 can be utilized when only one customer has placed an order on a website of an online retailer or, alternatively, when two or more customers have placed orders on the website of the retailer.

For example, in some embodiments, method 400 can be utilized when two or more customers have placed or are placing an order on the website of the retailer. In these and other embodiments, a prior customer makes a prior order on the website before a later or first customer, who makes a first order on the website after the prior customer made the prior order. Thus, method 400 can optionally comprise an activity 405 of receiving a prior order from an electronic device of a prior customer for a delivery of one or more items of the prior order at a second address. While activity 405 pertains to an order for delivery of one or more items to an address associated with or otherwise selected by the prior customer, in other embodiments, the prior order can comprise a prior order for a pickup by the prior customer. Although references are made to deliveries of orders to customers, it is understood that the systems and methods can include a customer placing an order for delivery to another person who may or may not be a customer.

In many embodiments, when the prior customer is placing the prior order, system 300 (FIG. 3) allows the prior customer to choose from a plurality of windows of time for pickup or delivery of the prior order. These windows of time can comprise 10-minute windows of time, 15-minute windows of time, 30-minute windows of time, 60-minute windows of time, and so on. For example, method 400 also can optionally comprise an activity 410 of, prior to receiving the first order from the electronic device of the first customer, coordinating displaying the plurality of windows of time on the electronic device of the prior customer. Activity 410 can additionally or alternatively comprise generating instructions for providing an interface on the electronic device of the prior customer that displays the plurality of windows of time.

In some embodiments, activity 410 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location. In some embodiments, activity 410 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

Once the plurality of windows of time have been displayed on the electronic device of the prior customer, method 400 also can optionally comprise an activity 415 of, prior to receiving the first order from the first electronic device of the first customer, receiving a prior selection of a first window of time from the electronic device of the prior customer. The first window of time can be a window of time in which (1) the prior customer will pick up the prior order at the brick and mortar retail store, distribution center, or fulfillment center, or (2) a delivery driver will deliver the prior order to the prior customer at an address associated with or otherwise selected by the prior customer. In some embodiments, the prior order can comprise a pickup surcharge or delivery surcharge for pickup or delivery, respectively, of the prior order.

After receiving the prior order and/or first window of time selected by the prior customer, method 400 can comprise an activity 420 of receiving a first order from an electronic device of a first customer, the first order comprising one or more first items. As previously noted, the orders made by customers as part of method 400 can be pickup orders or delivery orders. Thus, in some embodiments, activity 420 can comprise receiving the first order from the electronic device of the first customer for a first pickup of the first order at a store by the first customer. In other embodiments, activity 420 can comprise receiving the first order from the electronic device of the first customer for a first delivery of the one or more first items of the first order at a first address associated with or otherwise selected by the first customer.

When an order is received or during the order process, system 300 (FIG. 3) can depending on whether the order is for pickup or delivery, determine if (1) a store employee is available to collect the order for pickup by the customer during a certain window of time, or (2) a store employee is available to collect the order and a driver is available to deliver the order during a certain window of time. Thus, method 400 also can comprise an activity 425 of determining at least one of a store employee or a delivery driver is available to fulfill the first order during a first window of time of a plurality of windows of time. As described in greater detail below, the first window of time for the first customer can relate to (e.g., be the same as) the first window of time selected by the prior customer, or can be irrelevant to the first window of time selected by the prior customer. As also described in greater detail below, fulfillment of the order can comprise (1) only collection of the order if the order is a pickup order, (2) only delivery of the order if the order is a delivery order, or (3) collection of the order and delivery of the order if the order is a delivery order.

More particularly, if the first order is an order for pickup by the first customer, activity 425 can comprise determining the store employee is available to collect the first order to fulfill the first order during the first window of time. Collection of the first order by the store employee can comprise collection of the one or more items of the first order from a brick and mortar retail store, a warehouse, a distribution center, etc. Similarly, pickup of the first order by the first customer can comprise pickup of the first order at the brick and mortar retail store, the warehouse, the distribution center, etc.

If the first order is an order for pickup by the first customer, availability of the store employee can be determined irrespective to the window of time selected by the prior customer. Determining that the store employee is available to collect the first order to fulfill the first order during the first window of time can be beneficial to operations of the store. For example, if the store employee is scheduled to collect other orders during a second window of time and a third window of time but available to collect an order during the first window of time, assigning the store employee to collect the first order to fulfill the first order during the first window of time utilizes the time of the store employee more efficiently.

Furthermore, if the first order is an order for delivery to the first customer, activity 425 can comprise (1) determining the store employee is available to collect the one or more first items of the first order during the first window of time and (2) determining the delivery driver is available to deliver the one or more first items of the first order at the first address also during the first window of time to fulfill the first order. Collection of the first order by the store employee can comprise collection of the first order from a brick and mortar retail store, a warehouse, a distribution center, etc.

In some embodiments, availability of the store employee and the delivery driver for the first order can be determined irrespective to the window of time selected by the prior customer. Determining that the store employee is available to collect the first order and the delivery driver is available to deliver the first order to fulfill the first order during the first window of time can be beneficial to operations of the store. For example, if (1) the store employee is scheduled to collect other orders during a second window of time and a third window of time but available to collect an order during the first window of time and (2) the delivery driver is scheduled to deliver other orders not near the first address of the first order during the second window of time and the third window of time but available during the first window of time, then assigning the store employee to collect the first order and the delivery driver to deliver the first order to fulfill the first order during the first window of time utilizes the time of the store employee and/or the delivery driver more efficiently.

Moreover, if the first order is an order for delivery to the first customer, activity 425 can comprise determining the delivery driver is available to deliver (1) the one or more first items of the first order at the first address during the first window of time to fulfill the first order, and (2) the one or more second items of the prior order at the second address during the first window of time to fulfill the prior order. In these and other embodiments, availability of the delivery driver to deliver the first order during the first window of time pertains or correlates directly to the window of time selected by the prior customer for delivery of the prior order. For example, in some embodiments, determining that the delivery driver is available to deliver both the first order to the first customer and also the prior order to the prior customer during the first window of time can be based on the first address of the first order and the second address of the prior order being within a first predetermined proximity of each other.

Determining that the delivery driver is available to deliver both the first order to the first customer and also the prior order to the prior customer during the first window of time can be beneficial to operations of the store. For example, if the delivery driver can deliver both the first order to the first customer and also the prior order to the prior customer during the first window of time and/or in a single trip, then less gas is and time used for delivery of the orders. Furthermore, if the delivery driver is from a third-party delivery service, such as but not limited to a crowd-sourced third-party delivery service, then the store saves money on the expense of paying the delivery driver to make two separate trips to deliver the two orders.

After determining at least one of a store employee or a delivery driver is available to fulfill the first order during a first window of time of a plurality of windows of time, method 400 can comprise an activity 430 of coordinating displaying the plurality of windows of time on the electronic device of the first customer with a first discounted price for the first order proximate the first window of time. Activity 430 also can include generating instructions for providing an interface that displays the plurality of windows of time on the electronic device of the first customer with a first discounted price for the first order proximate the first window of time. In some embodiments, the first discounted price can comprise a certain monetary amount to be taken off the total price. For example, activity 430 can comprise coordinating displaying the plurality of windows of time on the electronic device of the first customer with a "$2 off" displayed proximate the first window of time. In other embodiments, the first discounted priced can comprise the total cost of the order, with a reduced priced displayed proximate the first window of time, and all other windows of time can have a full price displayed proximate each respective window of time of the other windows of the time. In some embodiments, the first discounted price is discounted from a first delivery charge for the first order and not from the price of the one or more items in the order.

As described above, in some circumstances it can be advantageous to the store if the customer selects a certain window of time. For example, a store employee may have more time to collect the order during a certain window of time, and/or a prior order for delivery is scheduled to be delivered during a certain window of time and is near enough to an ongoing or new order to allow a delivery driver to deliver both orders within the certain window of time.

In some embodiments, activity 430 can optionally comprise coordinating displaying (1) the plurality of windows of time on the electronic device of the first customer with the first discounted price for the first order proximate the first window of time and also (2) a second icon configured to redirect the first customer to a map webpage upon selection of the second icon by the first customer. The map webpage is described in greater detail below. Activity 430 also can comprise an activity of generating instructions for providing an interface on the electronic device of the first customer that displays the plurality of windows of time and the second icon.

Method 400 also can comprise an activity 435 of, if the one or more non-transitory storage modules receive a first selection of the first window of time from the electronic device of the first customer, coordinating displaying a first order completion page with the first discounted price for the first order. Activity 435 also can comprise generating instructions for providing an interface on the electronic device of the first customer that displays the first order completion page with the first discount price for the first order. In some embodiments, method 400 also can comprise an activity of coordinating displaying the first order and/or the address of the first customer on an employee electronic device of the store employee and/or on a driver electronic device of the delivery driver. In these and other embodiments, method 400 can comprise an activity of generating instructions for providing an interface on the employee electronic device and/or the driver electronic device that displays the first order and/or address of the first customer.

Method 400 also can optionally comprise an activity 440 of coordinating displaying a map webpage on the electronic device of the first customer. Activity 440 also can comprise generating instructions for providing an interface on the electronic device of the first customer that displays the map webpage. In some embodiments, the map webpage can comprise one or more of: (1) a map of an area within a second predetermined proximity of at least one of the first address or the second address; (2) a geometric shape on the map overlaying the first address and the second address; (3) a prompt within the geometric shape for the first customer to select the first window of time to activate the first discounted price for the first customer and a second discounted price for the prior customer; and/or (4) the first discounted price proximate a first icon displaying the first window of time and configured to receive a selection of the first window time by the first customer.

With respect to the second discounted price for the prior customer, in some embodiments, method 400 can optionally comprise an activity of, if the first selection of the first window of time is received by system 300 (FIG. 3) from the electronic device of the first customer, determining the prior order made prior to the first order is eligible for a second discounted price because the first customer selected the first window of time for delivery of the first order. Similarly, in some embodiments, method 400 can optionally comprise an activity of, if the first selection of the first window of time is received by system 300 (FIG. 3) from the electronic device of the first customer, determining the prior order made prior to the first order is eligible for a second discounted price because the first customer selected the first window of time for pickup of the first order. In some embodiments, the second discounted price is discounted from a second delivery charge for the prior order and not from the price of the one or more second items of the prior order. Furthermore, in some embodiments, method 400 can optionally comprise an activity of coordinating transmitting a notification to the electronic device of the second customer indicating that the second discounted price has been applied to the prior order. For example, system 300 (FIG. 3) can generate instructions for providing an interface on the electronic device of the second customer that indicates the second discounted price has been applied to the prior order.

FIG. 5 illustrates a block diagram of a portion of system 300 comprising order system 310, web server 320, and display system 360, according to the embodiment shown in FIG. 3. Each of order system 310, web server 320, and display system 360, is merely exemplary and not limited to the embodiments presented herein. Each of order system 310, web server 320, and/or display system 360 can be employed in many different embodiments or examples not specifically depicted or described herein. In some embodiments, certain elements or modules of order system 310, web server 320, and/or display system 360 can perform various procedures, processes, and/or acts. In other embodiments, the procedures, processes, and/or acts can be performed by other suitable elements or modules.

In many embodiments, order system 310 can comprise non-transitory memory storage module 512. Memory storage module 512 can be referred to as order module 512. In many embodiments, order module 512 can store computing instructions configured to run on one or more processing modules and perform one or more acts of method 400 (FIG. 4) (e.g., activity 405 of receiving a prior order from an electronic device of a prior customer for a second delivery of one or more items of the prior order at a second address, activity 415 of receiving a prior selection of the first window of time from the electronic device of the prior customer, activity 420 of receiving a first order from an electronic device of a first customer, the first order comprising one or more items, and activity 425 of determining at least one of a store employee or a delivery driver is available to fulfill the first order during a first window of time of a plurality of windows of time (FIG. 4)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 410 of coordinating displaying the plurality of windows of time on the electronic device of the prior customer, activity 430 of coordinating displaying the plurality of windows of time on the electronic device of the first customer with a first discounted price for the first order proximate the first window of time, activity 435 of coordinating displaying a first order completion page with the first discounted price for the first order, and activity 440 of coordinating displaying a map webpage on the electronic device of the first customer (FIG. 4)).

Although systems and methods for determining discounted prices for online orders have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory storage devices storing computing instructions configured to run on the one or more processors and cause the one or more processors to perform acts of:
     receiving a pre-first order from a pre-first electronic device of a pre-first customer for a pre-first delivery of one or more pre-first items of the pre-first order, the pre-first order comprising one or more pre-first times;
     determining at least one of (1) a store employee or (2) a delivery driver is available to fulfill the pre-first order during a first window of time of a plurality of windows of time, the first window of time comprising at least one time of the one or more pre-first times;
     coordinating displaying the plurality of windows of time on the pre-first electronic device of the pre-first customer with a pre-first price for the pre-first order proximate the first window of time;
     when the one or more processors receive a pre-first selection of the first window of time from the pre-first electronic device of the pre-first customer, coordinating displaying a pre-first order completion page on the pre-first electronic device of the pre-first customer;
     receiving a first order from a first electronic device of a first customer for a first delivery of one or more first items of the first order, wherein:
       the first order comprises one or more first times; and
       the one or more first times comprise the first window of time;
     coordinating displaying the one or more first times on the first electronic device of the first customer with a first discounted price for the first order proximate the first window of time, the first discounted price comprising a first price of the first order minus at least a first portion of a common delivery charge for both the pre-first order and the first order;
     when the one or more processors receive a first selection of the first window of time from the first electronic device of the first customer, coordinating displaying a first order completion page with the first discounted price for the first order;
     modifying the pre-first price of the pre-first order to create a pre-first discounted price by subtracting a pre-first portion of the common delivery charge for both the pre-first order and the first order from the pre-first price of the pre-first order; and
     facilitating delivering the first order and the pre-first order by a same delivery vehicle.

2. The system of claim 1, wherein:
   determining the at least one of (1) the store employee or (2) the delivery driver is available to fulfill the pre-first order comprises:

determining the store employee is available to collect the pre-first order to fulfill the pre-first order during the first window of time; and the one or more non-transitory storage devices storing the computing instructions are further configured to run on the one or more processors and cause the one or more processors to perform an act of:

coordinating displaying the pre-first order on an employee electronic device of the store employee.

3. The system of claim 1, wherein:

receiving the first order from the first electronic device comprises:

receiving the first order from the first electronic device of the first customer for a first delivery of the one or more first items of the first order at a first address;

determining the at least one of (1) the store employee or (2) the delivery driver is available to fulfill the first order comprises:

determining the store employee is available to collect the one or more first items of the first order; and determining the delivery driver is available to deliver the one or more first items of the first order at the first address also during the first window of time to fulfill the first order; and the one or more non-transitory storage devices storing the computing instructions are further configured to run on the one or more processors and cause the one or more processors to perform an act of:

coordinating displaying the first order on an employee electronic device of the store employee and also on a driver electronic device of the delivery driver.

4. The system of claim 1, wherein:

receiving the pre-first order from the pre-first electronic device of the pre-first customer for the pre-first delivery of the one or more pre-first items of the pre-first order comprises:

receiving the pre-first order from the pre-first electronic device of the pre-first customer for the pre-first delivery of the one or more pre-first items of the pre-first order at a pre-first address;

receiving the first order from the first electronic device comprises:

receiving the first order from the first electronic device of the first customer for the first delivery of the one or more first items of the first order at a first address; and determining the at least one of (1) the store employee or (2) the delivery driver is available to fulfill the pre-first order comprises:

determining the delivery driver is available to deliver (i) the one or more first items of the first order at the first address during the first window of time to fulfill the first order and (ii) the one or more pre-first items of the pre-first order at the pre-first address during the first window of time to fulfill the pre-first order.

5. The system of claim 4, wherein determining the delivery driver is available to deliver (i) the one or more first items of the first order at the first address during the first window of time to fulfill the first order and (ii) the one or more pre-first items of the pre-first order at the pre-first address during the first window of time to fulfill the pre-first order comprises:

determining, based on the first address and the pre-first address being within a first predetermined proximity of each other, the delivery driver is available to deliver (i) the one or more first items of the first order at the first address during the first window of time to fulfill the first order and (ii) the one or more pre-first items of the pre-first order at the pre-first address during the first window of time to fulfill the pre-first order.

6. The system of claim 4, wherein the one or more non-transitory storage devices storing the computing instructions are further configured to run on the one or more processors and cause the one or more processors to perform an act of, when the one or more processors receive the first selection of the first window of time from the first electronic device of the first customer:

coordinating transmitting a notification to the pre-first electronic device indicating that the pre-first discounted price has been applied to the pre-first order.

7. The system of claim 5, wherein the one or more non-transitory storage devices storing the computing instructions are further configured to run on the one or more processors and cause the one or more processors to perform an act of:

coordinating displaying a map webpage on the first electronic device of the first customer, the map webpage comprising:

(1) a map of an area within a second predetermined proximity of at least one of the first address or the pre-first address;

(2) a geometric shape on the map overlaying the first address and the pre-first address;

(3) a prompt within the geometric shape for the first customer to select the first window of time to activate the first discounted price for the first customer and the pre-first discounted price for the pre-first customer; and (4) the first discounted price proximate a first icon displaying the first window of time, the first icon configured to receive a selection of the first window of time by the first customer.

8. The system of claim 7, wherein coordinating displaying the one or more first times on the first electronic device of the first customer with the first discounted price for the first order proximate the first window of time comprises:

coordinating displaying:

(1) the one or more first times on the first electronic device of the first customer with the first discounted price for the first order proximate the first window of time; and (2) a second icon configured to redirect the first customer to the map webpage upon a selection of the second icon by the first customer.

9. The system of claim 1, wherein:

the one or more non-transitory storage devices storing the computing instructions are further configured to run on the one or more processors and cause the one or more processors to perform acts of:

when the one or more processors receive a first selection of the first window of time from the first electronic device of the first customer:

coordinating transmitting a notification to the pre-first electronic device indicating that the pre-first discounted price has been applied to the pre-first order; and coordinating displaying a map webpage on the first electronic device of the first customer, the map webpage comprising:

(1) a map of an area within a second predetermined proximity of at least one of a first address or a pre-first address;

(2) a geometric shape on the map overlaying the first address and the pre-first address;

(3) a prompt within the geometric shape for the first customer to select the first window of time to activate the first discounted price for the first customer and the pre-first discounted price for the pre-first customer; and (4) the first discounted price proximate a first icon displaying the first window of time, the first icon configured to receive a selection of the first window of time by the first customer;

receiving the pre-first order from the pre-first electronic device of the pre-first customer for the pre-first delivery of the one or more pre-first items of the pre-first order comprises:

receiving the pre-first order from the pre-first electronic device of the pre-first customer for the pre-first delivery of the one or more pre-first items of the pre-first order at the pre-first address;

receiving the first order from the first electronic device comprises:

receiving the first order from the first electronic device of the first customer for a first delivery of the one or more first items of the first order at the first address;

determining the at least one of (1) the store employee or (2) the delivery driver is available to fulfill the first order comprises:

determining, based on the first address and the pre-first address being within a first predetermined proximity of each other, the delivery driver is available to deliver (i) the one or more first items of the first order at the first address during the first window of time to fulfill the first order and (ii) the one or more pre-first items of the pre-first order at the pre-first address during the first window of time to fulfill the pre-first order; and coordinating displaying the one or more first times on the first electronic device of the first customer with the first discounted price for the first order proximate the first window of time comprises:

coordinating displaying (1) the one or more first times on the first electronic device of the first customer with the first discounted price for the first order proximate the first window of time and (2) a second icon configured to redirect the first customer to the map webpage upon a selection of the second icon by the first customer.

10. A method being implemented via execution of computing instructions configured to run at one or more processors and configured to be stored at non-transitory computer-readable media, the method comprising:

receiving a pre-first order from a pre-first electronic device of a pre-first customer for a pre-first delivery of one or more pre-first items of the pre-first order, the pre-first order comprising one or more pre-first times;

determining at least one of (1) a store employee or (2) a delivery driver is available to fulfill the pre-first order during a first window of time of a plurality of windows of time, the first window of time comprising at least one time of the one or more pre-first times;

coordinating displaying the plurality of windows of time on the pre-first electronic device of the pre-first customer with a pre-first price for the pre-first order proximate the first window of time;

when the one or more processors receive a pre-first selection of the first window of time from the pre-first electronic device of the pre-first customer, coordinating displaying a pre-first order completion page on the pre-first electronic device of the pre-first customer;

receiving a first order from a first electronic device of a first customer for a first delivery of one or more first items of the first order, wherein the first order comprises one or more first times; and the one or more first times comprise the first window of time;

coordinating displaying the one or more first times on the first electronic device of the first customer with a first discounted price for the first order proximate the first window of time, the first discounted price comprising a first price of the first order minus at least a first portion of a common delivery charge for both the pre-first order and the first order;

when the one or more processors receive a first selection of the first window of time from the first electronic device of the first customer, coordinating displaying a first order completion page with the first discounted price for the first order;

modifying the pre-first price of the pre-first order to create a pre-first discounted price by subtracting a pre-first portion of the common delivery charge for both the pre-first order and the first order from the pre-first price of the pre-first order; and facilitating delivering the first order and the pre-first order by a same delivery vehicle.

11. The method of claim 10, wherein:

determining at least one of (1) the store employee or (2) the delivery driver is available to fulfill the first order comprises:

determining the store employee is available to collect the first order to fulfill the first order during the first window of time; and the method further comprises:

coordinating displaying the first order on an employee electronic device of the store employee.

12. The method of claim 10, wherein:

receiving the first order from the first electronic device comprises:

receiving the first order from the first electronic device of the first customer for a first delivery of the one or more first items of the first order at a first address;

determining the at least one of (1) the store employee or (2) the delivery driver is available to fulfill the first order comprises:

determining the store employee is available to collect the one or more first items of the first order; and determining the delivery driver is available to deliver the one or more first items of the first order at the first address also during the first window of time to fulfill the first order; and the method further comprises:

coordinating displaying the first order on an employee electronic device of the store employee and also on a driver electronic device of the delivery driver.

13. The method of claim 10, wherein:

receiving the pre-first order from the pre-first electronic device of the pre-first customer for the pre-first delivery of the one or more pre-first items of the pre-first order comprises:

receiving the pre-first order from the pre-first electronic device of the pre-first customer for the pre-first delivery of the one or more pre-first items of the pre-first order at a pre-first address;

receiving the first order from the first electronic device comprises:

receiving the first order from the first electronic device of the first customer for a first delivery of the one or more first items of the first order at a first address; and determining the at least one of (1) the store employee or (2) the delivery driver is available to fulfill the first order comprises:

determining the delivery driver is available to deliver (i) the one or more first items of the first order at the first address during the first window of time to fulfill the first order and (ii) the one or more pre-first items of the pre-first order at the pre-first address during the first window of time to fulfill the pre-first order.

14. The method of claim 13, wherein determining the delivery driver is available to deliver (i) the one or more first items of the first order at the first address during the first window of time to fulfill the first order and (ii) the one or more pre-first items of the pre-first order at the pre-first address during the first window of time to fulfill the pre-first order comprises:

determining, based on the first address and the pre-first address being within a first predetermined proximity of each other, the delivery driver is available to deliver (i) the one or more first items of the first order at the first address during the first window of time to fulfill the first order and (ii) the one or more pre-first items of the pre-first order at the pre-first address during the first window of time to fulfill the pre-first order.

15. The method of claim 13, wherein the method further comprises, when the one or more processors receive the first selection of the first window of time from the first electronic device of the first customer:

coordinating transmitting a notification to the pre-first electronic device indicating that the pre-first discounted price has been applied to the pre-first order.

16. The method of claim 14, wherein the method further comprises:

coordinating displaying a map webpage on the first electronic device of the first customer, the map webpage comprising:
 (1) a map of an area within a second predetermined proximity of at least one of the first address or the pre-first address;
 2) a geometric shape on the map overlaying the first address and the pre-first address;
 (3) a prompt within the geometric shape for the first customer to select the first window of time to activate the first discounted price for the first customer and the pre-first discounted price for the pre-first customer; and
 (4) the first discounted price proximate a first icon displaying the first window of time, the first icon configured to receive a selection of the first window of time by the first customer.

17. The method of claim 16, wherein coordinating displaying the one or more first times on the first electronic device of the first customer with the first discounted price for the first order proximate the first window of time comprises:

coordinating displaying:
 (1) the one or more first times on the first electronic device of the first customer with the first discounted price for the first order proximate the first window of time; and
 2) a second icon configured to redirect the first customer to the map webpage upon selection of the second icon by the first customer.

18. The method of claim 10 wherein:

the method further comprises:
 when the one or more processors receive the first selection of the first window of time from the first electronic device of the first customer:
  coordinating transmitting a notification to the pre-first electronic device indicating that the pre-first discounted price has been applied to the pre-first order; and
  coordinating displaying a map webpage on the first electronic device of the first customer, the map webpage comprising:
   (1) a map of an area within a second predetermined proximity of at least one of a first address or a pre-first address;
   (2) a geometric shape on the map overlaying the first address and the pre-first address;
   (3) a prompt within the geometric shape for the first customer to select the first window of time to activate the first discounted price for the first customer and the pre-first discounted price for the pre-first customer; and
   (4) the first discounted price proximate a first icon displaying the first window of time, the first icon configured to receive a selection of the first window of time by the first customer;

receiving the pre-first order from the pre-first electronic device of the pre-first customer for the pre-first delivery of the one or more pre-first items of the pre-first order comprises:
 receiving the pre-first order from the pre-first electronic device of the pre-first customer for the pre-first delivery of the one or more pre-first items of the pre-first order at the pre-first address;

receiving the first order from the first electronic device comprises:
 receiving the first order from the first electronic device of the first customer for a first delivery of the one or more first items of the first order at the first address;

determining the at least one of (1) the store employee or (2) the delivery driver is available to fulfill the first order comprises:
 determining, based on the first address and the pre-first address being within a first predetermined proximity of each other, the delivery driver is available to deliver (i) the one or more first items of the first order at the first address during the first window of time to fulfill the first order and (ii) the one or more pre-first items of the pre-first order at the pre-first address during the first window of time to fulfill the pre-first order; and coordinating displaying the one or more first times on the first electronic device of the first customer with the first discounted price for the first order proximate the first window of time comprises:
 coordinating displaying (1) the one or more first times on the first electronic device of the first customer with the first discounted price for the first order proximate the first window of time and
 (2) a second icon configured to redirect the first customer to the map webpage upon selection of the second icon by the first customer.

19. The system of claim 1 wherein facilitating delivering the first order and the pre-first order comprises:

transmitting the first order and the pre-first order to a third party delivery service.

20. The method of claim 10 wherein facilitating delivering the first order and the pre-first order comprises:

transmitting the first order and the pre-first order to a third party delivery service.

\* \* \* \* \*